(12) United States Patent
Giraldo

(10) Patent No.: US 9,097,888 B2
(45) Date of Patent: Aug. 4, 2015

(54) ELECTROWETTING DISPLAY DEVICE WITH LIGHT DIFFUSER

(71) Applicant: Liquavista B.V., Eindhoven (NL)

(72) Inventor: Andrea Giraldo, Riehen (CH)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/299,756

(22) Filed: Jun. 9, 2014

(65) Prior Publication Data

US 2014/0285869 A1  Sep. 25, 2014

Related U.S. Application Data

(63) Continuation of application No. PCT/EP2012/074872, filed on Dec. 7, 2012.

(30) Foreign Application Priority Data

Dec. 9, 2011 (GB) .................................. 1121212.3

(51) Int. Cl.
*G02B 26/00* (2006.01)
*G09G 3/34* (2006.01)

(52) U.S. Cl.
CPC .............. *G02B 26/005* (2013.01); *G09G 3/348* (2013.01); *G02B 2207/115* (2013.01)

(58) Field of Classification Search
USPC .................................................. 359/290–297
See application file for complete search history.

(56) References Cited

U.S. PATENT DOCUMENTS

| 6,144,430 | A | 11/2000 | Kuo | |
|---|---|---|---|---|
| 8,730,555 | B2 * | 5/2014 | Aubert et al. ................. | 359/290 |
| 8,908,254 | B2 * | 12/2014 | Feenstra et al. .............. | 359/290 |
| 2014/0016178 | A1 * | 1/2014 | Rosser .......................... | 359/290 |

FOREIGN PATENT DOCUMENTS

| WO | 03071346 A1 | 8/2003 |
|---|---|---|
| WO | 03032025 A3 | 10/2003 |
| WO | 2006017129 A2 | 2/2006 |
| WO | 2007141219 A1 | 12/2007 |
| WO | 2007141220 A1 | 12/2007 |
| WO | 2010052305 A1 | 5/2010 |

* cited by examiner

*Primary Examiner* — Mohammed Hasan
(74) *Attorney, Agent, or Firm* — BainwoodHuang

(57) ABSTRACT

An electrowetting display device includes at least one picture element having a first support plate, a second support plate and a space between the first support plate and the second support plate. The first support plate includes a reflector for reflecting light and the second support plate includes a light diffuser.

16 Claims, 1 Drawing Sheet

ELECTROWETTING DISPLAY DEVICE WITH LIGHT DIFFUSER

CROSS REFERENCE TO RELATED APPLICATIONS

This application is a continuation of PCT Application No. PCT/EP2012/074872 filed Dec. 7, 2012.

BACKGROUND

A known reflective electrowetting display device may include a plurality of picture elements. A picture element includes a space between a first and a second support plate. A coloured first fluid and an immiscible electroconductive second fluid are arranged in the space. The configuration of the fluids can be controlled by applying a voltage between an electrode in the first support plate and the second fluid. Without an applied voltage, the first fluid forms a layer on the first support plate. When a voltage is applied, the electroconductive second fluid penetrates through the first fluid and moves the first fluid over the first support plate to a side of the picture element. The fluids thereby operate as a light switch. Ambient light incident from the viewing side of the display device on the second support plate and transmitted through the space is reflected on a diffuse reflector in the first support plate back towards the viewing side.

It is desirable to improve the quality of an image displayed on the display device.

DETAILED DESCRIPTION

Figure 1:
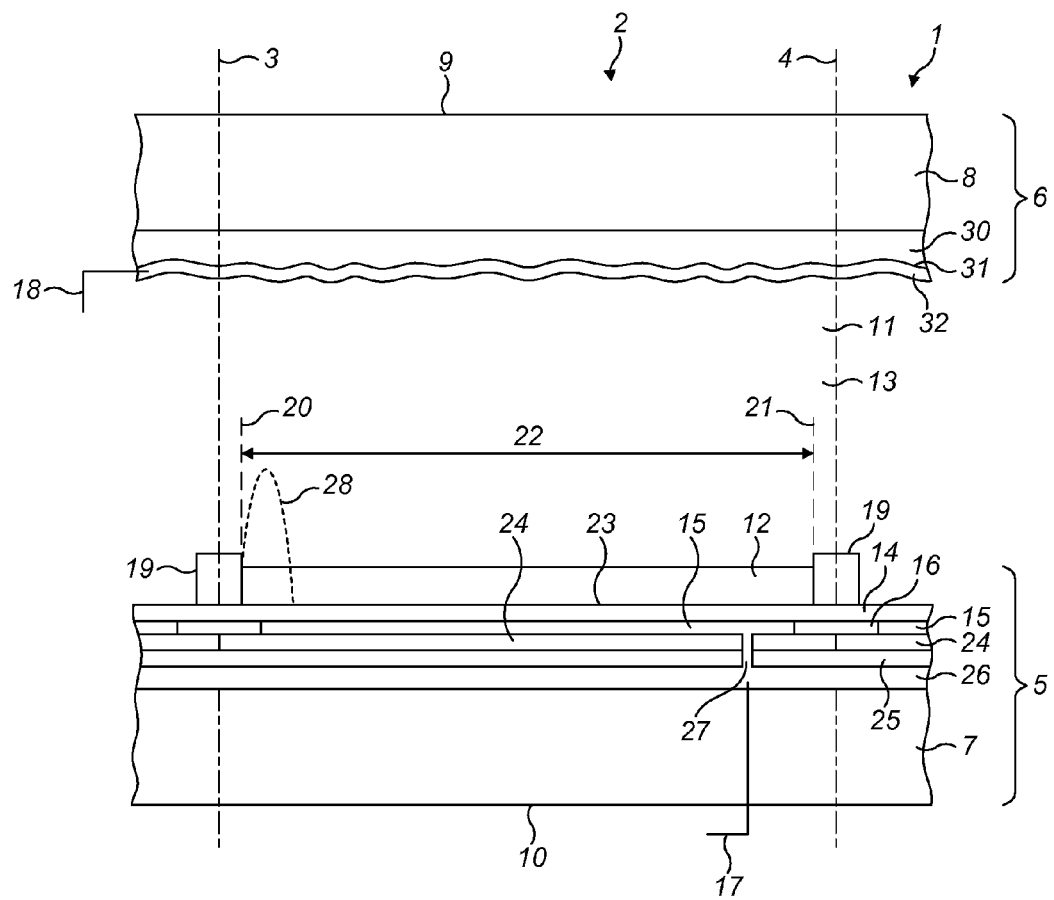
FIG. 1 shows a schematic cross-section of part of an electrowetting display device.

The entire contents of the following applications are incorporated by reference herein:
PCT/EP2012/074872 filed Dec. 7, 2012
GB 1121212.3 filed Dec. 9, 2011

Embodiments described herein relate to an electrowetting display device. Embodiments will firstly be described in summary form.

In accordance with embodiments, there is provided an electrowetting display device comprising at least one picture element having a first support plate, a second support plate and a space between the first support plate and the second support plate, the first support plate including a reflector for reflecting light,
  the space including a first fluid and a second fluid immiscible with each other, the first fluid forming a layer on the first support plate when no voltage is applied to the picture element and the second fluid being electrically conductive or polar,
  wherein the second support plate includes a light diffuser on the side of the second support plate facing the space.

Embodiments also relate to a support plate for use in an electrowetting display device, the support plate including a light diffuser.

Embodiments are based on the insight that the quality of an image displayed by some known display devices is reduced by non-uniformity of the motion of the first fluid on application of a voltage between different picture elements, and that at least part of this non-uniformity of motion is caused by the presence of the diffuse reflector in the first support plate. In a known example the diffuse reflector has a reflecting surface with random height differences. The height differences cause a diffuse reflection of incident light. Since the reflector is arranged on the side of the first support plate facing the space, the surface of the first support plate over which the first fluid moves on application of a voltage to the picture element also shows height differences copied from the reflector. As a result, the layer of first fluid adjoining the first support plate when no voltage is applied varies in thickness. This variation affects the position in the picture element where the second fluid penetrates through the layer of first fluid and where the first fluid starts moving when increasing the applied voltage. Since the height differences are random, the positions in different picture elements are also random. This non-uniformity of the motion of the first fluid in different picture elements is readily visible to a viewer of the known display device and reduces the quality of images displayed on the device.

This non-uniform motion of the first fluid is addressed by arranging a substantially flat reflector in the first support plate and a light diffuser in the second support plate on the side of the second support plate facing the space. Since the reflector is substantially flat, it will not cause height variations of the surface of the first support plate over which the first fluid moves. Hence, the uniformity of the motion of the first fluid in the different picture elements of the display device will improve.

The reflected light is diffused by a light diffuser arranged in the second support plate. The height differences of the diffuser in the second support plate do not affect the operation of the picture element, because the second fluid near the second support plate is substantially stationary during operation and the thickness of the layer of second fluid is substantially larger than the height differences.

Ambient light incident on the second support plate of a picture element will first be diffused on passing the light diffuser in the second support plate, next reflected by the reflector in the first support plate and then diffused again by the light diffuser in the second support plate. The arrangement of the light diffuser in the second support plate on the side facing the space of the picture element instead of on the viewing side improves the sharpness of the image and permits the display of a more paper-like image.

Examples of embodiments will now be described in detail.

FIG. 1 shows a schematic cross-section of part of a reflective electrowetting display device 1 according to an embodiment. The display device includes at least one picture element 2, also known as a pixel, one of which is shown in the FIGURE. The lateral extent of the picture element is indicated in the FIGURE by two dashed lines 3, 4. The display device comprises a first support plate 5 and a second support plate 6. The support plates may be separate parts of each picture element, or the support plates may be shared in common by the plurality of picture elements. The support plates may include a glass or polymer substrate 7, 8 and may be rigid or flexible. The display device has a viewing side 9 on which an image or display formed by the display device can be viewed and a rear side 10. In the embodiment of FIG. 1 the first support plate 5 faces the rear side; the second support plate 6 faces the viewing side.

The display device may be of the reflective or transflective type. The display device may be of a segmented display device type in which the image is built up of segments and each segment may include one or more picture elements. The display device may be an active matrix driven type or a passively driven type. The plurality of picture elements may be monochrome. Alternatively, for a full colour display device, the picture elements shown in the FIGURE may be sub-pixels, each sub-pixel having a different colour; alternatively, a different individual picture element may be able to show different colours.

A space 11 between the support plates includes two fluids: a first fluid 12 and a second fluid 13, wherein the fluids may, for example, be liquids. The second fluid is immiscible with the first fluid. The second fluid is electrically conductive or polar, and may be, for example, water or a salt solution such as a solution of potassium chloride in a mixture of water and ethyl alcohol. The second fluid may be transparent, but may be coloured. The first fluid is electrically non-conductive and may, for instance, be an alkane like hexadecane or (silicone) oil. The first fluid absorbs at least a part of the optical spectrum. The first fluid may be transmissive for a part of the optical spectrum, forming a colour filter. For this purpose the first fluid may be coloured by addition of pigment particles or dye. Alternatively, the first fluid may be black, i.e. absorbing substantially all parts of the optical spectrum.

A hydrophobic layer 14 is arranged in the support plate 5 and may be transparent or reflective. The hydrophobic layer may be an uninterrupted layer extending over a plurality of picture elements 2, as shown in the FIGURE, or it may be an interrupted layer, each part extending only over one or more picture elements 2. The layer may be for instance an amorphous fluoropolymer layer such as AF1600 or another low surface energy polymer. The hydrophobic character causes the first fluid 12 to adhere preferentially to the first support plate 5.

The first support plate 5 includes an electrode 15 for each picture element. The electrode is separated from the fluids by an electrically insulating cover layer, which may be the hydrophobic layer 14 or an additional insulating layer, not shown in the FIGURE. Further layers may be arranged between the hydrophobic layer and the electrode. The electrode 15 can be of any desired shape or form and in this example is planar; it is made of an electrically conducting material and may be transparent or reflective. The electrodes of neighbouring picture elements are separated by an insulating layer 16. The electrode 15 is supplied with voltage signals by a signal line 17. A second signal line 18 is connected to an electrode which is in contact with the conductive second fluid 13; this electrode may pertain to one picture element or may be common to a plurality of or all picture elements. The electrode may be in contact with the second fluid locally and the picture elements share the second fluid, uninterrupted by walls. Alternatively, the electrode may extend over the picture elements, with either a shared second fluid or a second fluid confined to picture elements by walls extending from the first to the second support plate. The display state of the picture element 2 can be controlled by a voltage V applied between the signal lines 17 and 18. The electrodes 15 of the support plate 5 each are coupled to a display driving system.

In a display device having the elements arranged in a matrix form, the electrodes can be coupled to a matrix of control lines in the first support plate. The first fluid 12 is confined to a single picture element by walls 19 that follow the extent of the picture element. The walls may extend from the first to the second support plate but may also extend partly from the first support plate to the second support plate. Although the walls are shown as structures of the first support plate 5 that protrude from the planar surface of the hydrophobic layer 14, they may instead be a surface layer of the first support plate that repels the first fluid, such as a hydrophilic layer. The extent of the picture element, indicated by the dashed lines 3 and 4, is defined by the centre of the walls 19. The area of the hydrophobic layer 14 between the walls of a picture element, indicated by the dashed lines 20 and 21, is a display area 22 over which a display effect occurs. The display area 22 lies in the plane of a surface 23 of the hydrophobic layer 14.

In a colour display device a colour filter 24 may be arranged in the first support plate 5, for example between the electrode 15 and the substrate 7, neighbouring picture elements having different colours. The extent of the colour filter in the embodiment of the FIGURE is one picture element; hence, different picture elements may have different colour filters. Alternatively, the colour filter may be arranged in the second support plate or two or more colour filters may be arranged in both support plates.

A reflector 25 in the first support plate reflects light incident on the picture element from the viewing side 9, the light usually being ambient light. The reflector is typically a thin layer of a reflecting material. The reflector may be planar, thereby operating as a specular reflector. Such a reflector is relatively easy to make. The reflection is also called specular if the layer shows height differences having a period of the order of the size of the diameter of the picture element or larger. Such height differences may be caused by electronic components, such as transistors, control lines or capacitors arranged in the first support plate below the reflector.

Alternatively, the reflector 25 may have a small degree of non-planarity, causing a lightly diffusive reflection. The non-planarity should be such that the motion of the first fluid 12 is not affected. The non-planarity of the reflector should normally be substantially less than 1 micrometer; a larger non-planarity may be possible when the layers between the reflector 25 and the space 11 have a sufficient planarising effect.

Whereas the embodiment shown in the FIGURE has the reflector as a separate element 25, the electrode 15 may have the function of a reflector if it is made of a reflective material.

The reflector 25 shown in the FIGURE covers the entire cross-section of the picture element. Alternatively, the reflector may be restricted to the display area 22. When the display device is not reflective but transflective, the reflector may cover only part of the display area 22 as disclosed in the different embodiments of international patent application WO07/141220.

The first support plate may include electronic elements, such as one or more control lines, transistors and capacitors for controlling the voltage on the electrode 15. The electronic elements are schematically indicated in the FIGURE by a layer 26. The electrode is connected to the electronic elements by a through-connection 27 or via. The through-connection can be relatively short and small in cross-section in the embodiment shown because of the thin layers 24 and 25 it passes through. In the known display device a diffuse reflector at the location of element 25 would have a substantially larger thickness requiring a longer through-connection, which would also have a larger cross-section.

When no voltage is applied between the electrodes, the first fluid 12 forms a layer between the walls 19, as shown in the FIGURE. This layer may have a typical thickness of 4 micrometer. The layer of second fluid 13 may have a typical thickness in the order of 50 micrometer. A typical size of the display area 22 is 160 micrometer by 160 micrometer. Application of a voltage between the electrode 15 and the second fluid 13 will contract the first fluid, for example against a wall as shown by the dashed shape 28 in the FIGURE. The shape of the first fluid is controllable by controlling the applied voltage, and is used to operate the picture element as a light valve, providing a display effect over the display area 22. Further details of features of the display device are described in international patent publication no. WO2003/071346, the contents of which is incorporated herein by way of reference.

The second support plate 6 includes a transparent light diffuser 30 on the side of the second support plate facing the space. Light incident on the display device from the viewing side 9 will be scattered, the directional distribution of the transmitted scattered light depending on the properties of the light diffuser. The light diffuser may include a non-planar surface, the non-planarity causing diffusion of the light. The refractive index on both sides of the non-planar surface should be different.

In the embodiment of FIG. 1 the light diffuser is a layer 30 having a varying thickness, such that a surface 31 of the layer 30 is non-planar. The surface 31 may for example have height differences in the order of 1 micrometer and an average pitch of 10 micrometer. The thickness of the layer 30 may be a few micrometer or more. The layer may be made using known methods, e.g. diffractive exposure using proximity masks on photosensitive material or contact exposure on photo-embossing material. An example of photosensitive material is TPIR made by Tokyo Ohka Kogyo Co.

A transparent, conductive layer 32 is arranged on the surface 31 to provide an electrical connection between the signal line 18 and the second fluid 13. The layer 32 may be made of ITO having for example a thickness between 25 and 125 nm. When the ITO layer follows the non-planarity of the surface 31, the refractive index between the layer 30 and the second fluid should be different. When the second fluid is an electrolyte having a refractive index of about 1.47, the refractive index of the material of the layer 30 may be between 1.5 and 1.7.

The electrical connection between the signal line 18 and the second fluid 13 may alternatively be made by a conductive strip surrounding the collection of picture elements. In this embodiment the surface 31 can adjoin the space 11. The refractive index of the layer 30 and the second fluid 13 should be different to obtain the diffusion effect; the above values of the refractive indices can be used.

The non-planar surface may have randomly and/or regularly arranged protrusions. The protrusions may have random shapes or regular shapes. Regular protrusions may have a circular or regular polygon shape; they may be wave-shaped, forming a corrugated surface. The pitch of the protrusions determines the angular range within which the light is diffused. The average pitch may be chosen differently for two perpendicular directions in the surface to achieve different degrees of diffusion for different viewing angles of the display device, e.g. in the horizontal and vertical direction, and increase the utilization efficiency of the incident light. The surface may have a local tilt such that the average direction of the diffused light is different from that of the incident light, thereby adapting the diffusion to a difference between the viewing direction and the direction of incidence of the light on the display device.

The above embodiments are to be understood as illustrative embodiments. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising at least one picture element having a first support plate, a second support plate and a space between the first support plate and the second support plate, the first support plate including a reflector for reflecting light, the space including a first fluid and a second fluid immiscible with each other, the first fluid forming a layer on the first support plate when no voltage is applied to the at least one picture element and the second fluid being one or more of: electrically conductive or polar, wherein the second support plate includes a light diffuser on a side of the second support plate facing the space, the light diffuser including a non-planar surface, and wherein, without a voltage being applied to the at least one picture element, the second fluid has a varying thickness across an extent of the at least one picture element, the varying thickness being dependent on a shape of the non-planar surface.

2. An electrowetting display device according to claim 1, wherein the second support plate includes a substrate, the light diffuser being arranged on a side of the substrate closest to the space.

3. An electrowetting display device according to claim 1, wherein the second fluid adjoins at least part of a non-planar surface of the second support plate, the non-planar surface of the second support plate being non-planar in dependence on a shape of the non-planar surface of the light diffuser.

4. An electrowetting display device according to claim 1, wherein the non-planar surface comprises a plurality of protrusions which are arranged in one or more of: a random pattern or a regular pattern.

5. An electrowetting display device according to claim 1, wherein the non-planar surface comprises a plurality of protrusions, a shape of at least one of the plurality of protrusions being one or more of: a shape with a circular cross-section, a shape with a regular polygon cross-section or a wave shape.

6. An electrowetting display device according to claim 1, wherein the non-planar surface comprises a plurality of protrusions, an average pitch of the plurality of protrusions being different in a first direction than in a second direction, the first and second directions being perpendicular to each other.

7. An electrowetting display device according to claim 1, wherein the second support plate includes a substrate and the light diffuser is a layer having a varying thickness arranged on the substrate.

8. An electrowetting display device according to claim 1, wherein the second fluid adjoins at least part of a surface of the light diffuser.

9. An electrowetting display device according to claim 1, wherein a refractive index of a material forming the light diffuser is different from a refractive index of the second fluid.

10. An electrowetting display device according to claim 1, wherein a colour filter is arranged in one or more of: the first support plate or the second support plate.

11. An electrowetting display device according to claim 1, wherein the reflector is a specular reflector.

12. An electrowetting display device according to claim 1, wherein the at least one picture element is transflective and the reflector covers part of a cross-section of the at least one picture element.

13. An electrowetting display device comprising at least one picture element having a first support plate, a second support plate and a space between the first support plate and the second support plate, the first support plate including a reflector for reflecting light, the space including a first fluid and a second fluid immiscible with each other, the first fluid forming a layer on the first support plate when no voltage is applied to the at least one picture element and the second fluid being one or more of: electrically conductive or polar, wherein the second support plate includes a light diffuser on a side of the second support plate facing the space, the light diffuser having a first side closest to the space and a second side furthest away from the space, wherein a refractive index of a medium adjoining the first side is one of more of: different from, or substantially the same as, a refractive index of a medium adjoining the second side.

14. An electrowetting display device according to claim 13, wherein the light diffuser includes a non-planar surface.

15. An electrowetting display device according to claim 14, wherein, without a voltage being applied to the at least one picture element, the second fluid has a varying thickness across an extent of the at least one picture element, the varying thickness being dependent on a shape of the non-planar surface.

16. An electrowetting display device according to claim 14, wherein the second fluid adjoins at least part of a non-planar surface of the second support plate, the non-planar surface of the second support plate being non-planar in dependence on a shape of the non-planar surface of the light diffuser.

* * * * *